United States Patent [19]

Benicewicz et al.

[11] Patent Number: 5,114,612
[45] Date of Patent: May 19, 1992

[54] LIQUID CRYSTAL POLYESTER THERMOSETS

[75] Inventors: Brian C. Benicewicz; Andrea E. Hoyt, both of Los Alamos, N. Mex.

[73] Assignee: The United States of America as represented by the Department of Energy, Washington, D.C.

[21] Appl. No.: 644,856

[22] Filed: Jan. 22, 1991

Related U.S. Application Data

[63] Continuation of Ser. No. 504,217, Apr. 4, 1990, abandoned.

[51] Int. Cl.⁵ .................... C09K 19/04; C09K 19/10; C08F 38/00
[52] U.S. Cl. .................... 252/299.01; 252/299.62; 252/299.64; 525/329.5; 525/397; 525/437; 526/285; 528/196; 528/219; 528/176
[58] Field of Search ............... 252/299.01; 525/328.1, 525/329.5; 526/285; 528/219

[56] References Cited

U.S. PATENT DOCUMENTS 3,651,012  3/1972  Holub ..................... 526/262
3,738,969  6/1973  Holub et al. ............ 528/322

(List continued on next page.)

FOREIGN PATENT DOCUMENTS 1313520  6/1988  Japan.
1074219  3/1989  Japan.
1074219A  3/1989  Japan.
1313511  12/1989  Japan.

OTHER PUBLICATIONS

CA 112 (24):218391f, (1990) (Kimura).
CA 111 (20):174913a, (1989) (Kato).
CA 112 (24):218390e, (1990) (Kimura).
Derwent Abstracts: J01313520-A; J01313511-A; J01074219-A.
Andrea & Hoyt Brian C. Benicewicz and Samuel J. Huang, Polym. Prepr. (Am. Chem. Soc., Div. Polym. Chem.) 30(2), 536-537, 1989.

*Primary Examiner*—Edward J. Smith
*Assistant Examiner*—Fred Zitomer
*Attorney, Agent, or Firm*—Bruce H. Cottrell; Paul D. Gaetjens; William R. Moser

[57] ABSTRACT

The present invention provides (1) curable liquid crystalline polyester monomers represented by the formula:

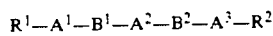

$$R^1-A^1-B^1-A^2-B^2-A^3-R^2$$

where $R^1$ and $R^2$ are radicals selected from the group consisting of maleimide, substituted maleimide, nadimide, substituted naimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms, $A^1$ and $A^3$ are 1,4-phenylene and the same where said group contains one or more substituents selected from the group consisting of halo, e.g., fluoro, chloro, bromo, or iodo, nitro lower alkyl, e.g., methyl, ethyl, or propyl, alkoxy, e.g., methoxy, ethoxy, or propoxy, and fluoroalkyl, e.g., trifluoromethyl, pentafluoroethyl and the like, $A^2$ is selected from the group consisting of 1,4-phenylene, 4,4'-biphenyl, 2,6-naphthylene and the same where said groups contain one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, and $B^1$ and $B^2$ are selected from the group consisting of —C(O)—O— and —O—C(O)—, (2) thermoset liquid crystalline polyester compositions comprised of heat-cured segments derived from monomers represented by the formula:

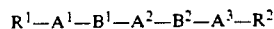

$$R^1-A^1-B^1-A^2-B^2-A^3-R^2$$

as described above, (3) curable blends of at least two of the polyester monomers and (4) processes of preparing the curable liquid crystalline polyester monomers.

7 Claims, 4 Drawing Sheets

U.S. PATENT DOCUMENTS

| | | | |
|---|---|---|---|
| 3,766,302 | 10/1973 | Holub et al. | 525/277 |
| 4,225,497 | 9/1980 | Baudouin et al. | |
| 4,418,181 | 11/1983 | Monacelli et al. | |
| 4,452,993 | 6/1984 | Conciatori et al. | |
| 4,514,553 | 4/1985 | Conciatori et al. | |
| 4,550,177 | 10/1985 | Kumar et al. | |
| 4,567,240 | 1/1986 | Hergenrother | 525/328.1 |
| 4,654,412 | 3/1987 | Calundann et al. | |
| 4,739,030 | 4/1988 | Lubowitz et al. | |
| 4,683,327 | 7/1987 | Stackman | |
| 4,684,714 | 8/1987 | Lubowitz et al. | |
| 4,739,030 | 4/1990 | Lubowitz et al. | |
| 4,745,135 | 5/1988 | Thomas et al. | |
| 4,745,136 | 5/1988 | Thomas et al. | |
| 4,745,137 | 5/1988 | Thomas et al. | |
| 4,762,901 | 8/1988 | Dhein et al. | |
| 4,764,581 | 8/1988 | Muller et al. | |
| 4,847,333 | 7/1989 | Lubowitz et al. | |
| 4,851,495 | 7/1989 | Sheppard et al. | |
| 4,851,501 | 7/1989 | Lubowitz et al. | |
| 4,876,328 | 11/1989 | Lubowitz et al. | |

LIQUID CRYSTAL POLYESTER THERMOSETS

This invention is the result of a contract with the Department of Energy (Contract No. W-7405-ENG-36).

This is a continuation of application Ser. No. 504,217, filed Apr. 4, 1990, now abandoned.

FIELD OF THE INVENTION

The present invention relates to the field of curable liquid crystal polyester monomers and to thermoset liquid crystalline polyester compositions prepared therefrom.

BACKGROUND OF THE INVENTION

Liquid crystal polymers are recognized as having great potential for the development of new materials with exceptional physical and mechanical properties. In general, liquid crystal polymers consist of polymer chains containing anisotropic structural units (mesogenic groups) which may be incorporated into the polymer backbone, as pendent groups, or both. The mesogenic groups may be rod-like or disc-like in nature. Fibers, films, and molded plastics processed from the liquid crystalline state have shown outstanding properties.

Another desirable characteristic of such liquid crystalline polymers would be that they be thermosetting. Liquid crystal thermosetting polymers are known, e.g., the acrylic-terminated thermoset resins and precursors disclosed by Conciatori et al. in U.S. Pat. Nos. 4,440,945, 4,452,993, and 4,514,553, the epoxy-terminated thermoset resins and precursors disclosed by Muller et al. in U.S. Pat. No. 4,764,581, and the various difunctionally terminated materials disclosed by Dhein et al. in U.S. Pat. No. 4,762,901.

Another type of thermosetting resins utilizing end groups such as maleimide, nadimide and methyl nadimide are described in various patents such as U.S. Pat. Nos. 4,225,497, 4,550,177, 4,739,030, 4,661,604, 4,684,714, 4,851,495, and 4,851,501.

Accordingly, it is an object of this invention to provide curable liquid crystalline polyester materials.

Another object of this invention is to provide a process of preparing curable liquid crystal polyester monomers.

Yet another object of this invention is to provide liquid crystalline blends of polyester materials.

It is a further object of this invention to provide thermoset liquid crystalline polyester compositions.

It is a still further object of this invention to provide thermoset liquid crystalline polyester compositions having a high heat resistance.

SUMMARY OF THE INVENTION

To achieve the foregoing and other objects, and in accordance with the purposes of the present invention, as embodied and broadly described herein, the present invention provides a curable liquid crystalline polyester monomer represented by the formula:

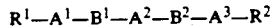

where $R^1$ and $R^2$ are radicals selected from the group consisting of maleimide, substituted maleimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms, $A^1$ and $A^3$ are 1,4-phenylene and the same where said group contains one or more substituents selected from the group consisting of halo, e.g., fluoro, chloro, bromo, or iodo, nitro, lower alkyl, e.g., methyl, ethyl, or propyl, lower alkoxy, e.g., methoxy, ethoxy, or propoxy, and fluoroalkyl, e.g., trifluoromethyl, pentafluoroethyl and the like, $A^2$ is selected from the group consisting of 1,4-phenylene, 4,4'-biphenyl, 2,6-naphthylene and the same where said groups contain one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, and $B^1$ and $B^2$ are selected from the group consisting of —C(O)—O— and —O—C(O)—. Preferably, $R^1$ and $R^2$ are radicals selected from the group consisting of maleimide, nadimide, methyl nadimide, and ethynyl.

The present invention further provides a thermoset liquid crystalline polyester composition comprised of cured segments derived from monomers represented by the formula:

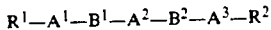

where $R^1$ and $R^2$ are radicals selected from the group consisting of maleimide, substituted maleimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms, $A^1$ and $A^3$ are 1,4-phenylene and the same where said group contains one or more substituents selected from the group consisting of halo, e.g., fluoro, chloro, bromo, or iodo, nitro, lower alkyl, e.g., methyl, ethyl, or propyl, lower alkoxy, e.g., methoxy, ethoxy, or propoxy, and fluoroalkyl, e.g., trifluoromethyl, pentafluoroethyl and the like, $A^2$ is selected from the group consisting of 1,4-phenylene, 4,4'-biphenyl, 2,6-naphthylene and the same where said groups contain one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, and $B^1$ and $B^2$ are selected from the group consisting of —C(O)—O— and —O—C(O)—. Preferably, $R^1$ and $R^2$ are radicals selected from the group consisting of maleimide, nadimide, methyl nadimide, and ethynyl.

The present invention also provides curable blends including at least two liquid crystalline polyester monomers represented by the formula:

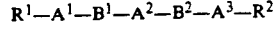

where $R^1$ and $R^2$ are radicals selected from the group consisting of maleimide, substituted maleimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms, $A^1$ and $A^3$ are 1,4-phenylene and the same where said group contains one or more substituents selected from the group consisting of halo, e.g., fluoro, chloro, bromo, or iodo, nitro, lower alkyl, e.g., methyl, ethyl, or propyl, lower alkoxy, e.g., methoxy, ethoxy, or propoxy, and fluoroalkyl, e.g., trifluoromethyl, pentafluoroethyl and the like, $A^2$ is selected from the group consisting of 1,4-phenylene, 4,4'-biphenyl, 2,6-naphthylene and the same where said groups contain one or more substituents selected from the group consisting of fluoro, chloro, bromo, iodo, nitro, methyl, ethyl, methoxy, ethoxy or trifluoromethyl, and $B^1$ and $B^2$ are selected from the group consisting of —C(O)—O— and —O—C(O)—.

The present invention still further provides a process of preparing a curable liquid crystalline polyester monomer represented by the formula:

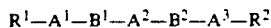

where $R^1$ and $R^2$ are radicals selected from the group consisting of maleimide, substituted maleimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms, $A^1$ and $A^3$ are 1,4-phenylene and the same where said group contains one or more substituents selected from the group consisting of halo, e.g., fluoro, chloro, bromo, or iodo, nitro, lower alkyl, e.g., methyl, ethyl, or propyl, lower alkoxy, e.g., methoxy, ethoxy, or propoxy, and fluoroalkyl, e.g., trifluoromethyl, pentafluoroethyl and the like, $A^2$ is selected from the group consisting of 1,4-phenylene, 4,4'-biphenyl, 2,6-naphthylene and the same where said groups contain one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, and $B^1$ and $B^2$ are selected from the group consisting of —C(O)—O— and —O—C(O)—, said process comprising: reacting a difunctional compound represented by the formula $B^3$—$A^2$—$B^4$ wherein $B^3$ and $B^4$ are —OH, and $A^2$ is selected from the group consisting of 1,4-phenylene, 4,4'-biphenyl, 2,6-naphthylene and the same where said groups contain one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, with an acid chloride represented by the formula: Cl—C(O)—$A^1$—$R^1$ wherein $A^1$ is 1,4-phenylene and the same containing one or more substitutes selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, and $R^1$ is a radical selected from the group consisting of maleimide, substituted maleimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms. Preferably, $R^1$ and $R^2$ are radicals selected from the group consisting of maleimide, nadimide, methyl nadimide, and ethynyl.

DETAILED DESCRIPTION

The present invention is concerned with curable or thermosettable liquid crystalline polyester compounds represented by the formula

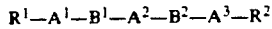

where $R^1$ and $R^2$ are radicals selected from the group consisting of maleimide, substituted maleimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms, $A^1$ and $A^3$ are 1,4-phenylene and the same where said group contains one or more substituents selected from the group consisting of halo, e.g., fluoro, chloro, bromo, or iodo, nitro, lower alkyl, e.g., methyl, ethyl, or propyl, lower alkoxy, e.g., methoxy, ethoxy, or propoxy, and fluoroalkyl, e.g., trifluoromethyl, pentafluoroethyl and the like, $A^2$ is selected from the group consisting of 1,4-phenylene, 4,4'-biphenyl, 2,6-naphthylene and the same where said groups contain one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, and $B^1$ and $B^2$ are selected from the group consisting of —C(O)—O— and —O— C(O)—. Where $R^1$ and $R^2$ are substituted maleimide or substituted nadimide, the substituents can include one or two groups selected from among lower alkyl, lower alkoxy, aryl, aryloxy, halogen, substituted alkyl, or substituted alkoxy upon the ring. Also, the bridging methylene group in nadimide may be replaced by groups such as oxo, thio, or sulfone. Preferably, $R^1$ and $R^2$ are radicals selected from the group consisting of maleimide, nadimide, methyl nadimide, and ethynyl.

Figure 1A:
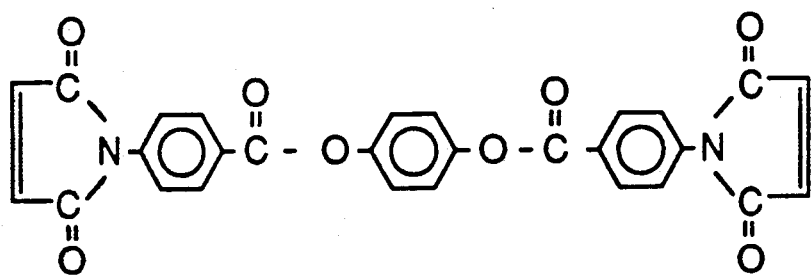
FIGS. 1(a)-1(o) depict, by structural formula, liquid crystalline polyester compounds of the present invention.
Figure 1B:
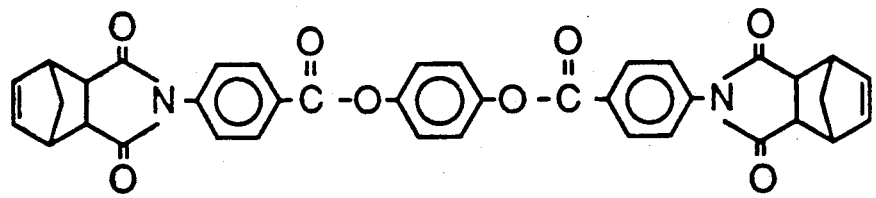
Figure 1C:
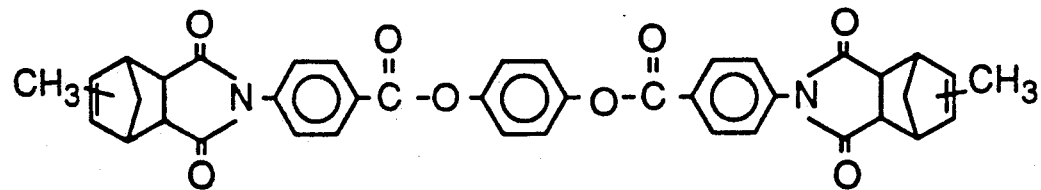
Figure 1D:
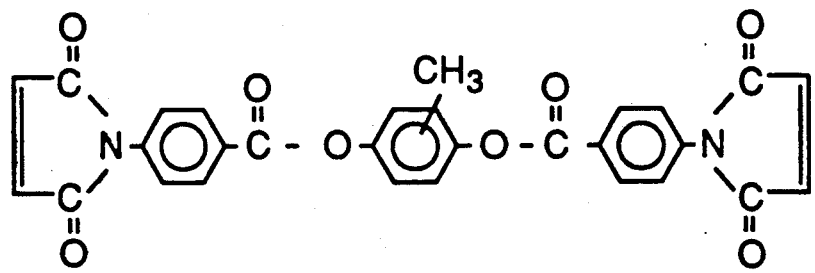
Figure 1E:
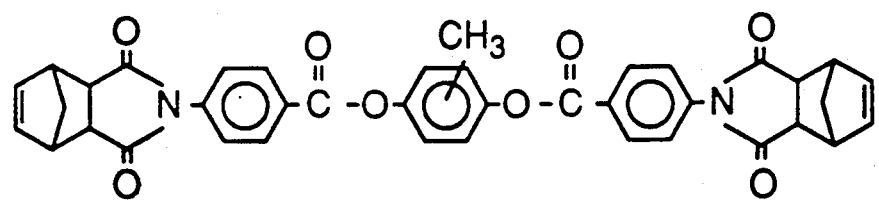
Figure 1F:
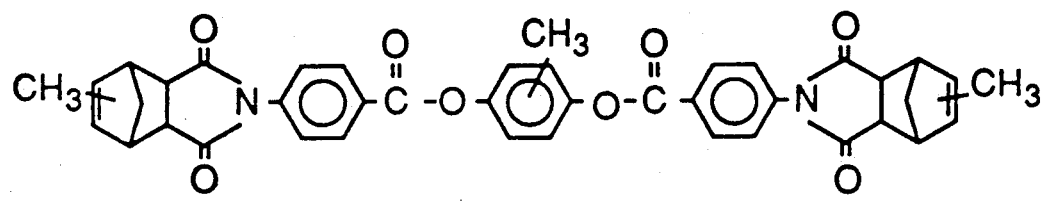
Figure 1G:
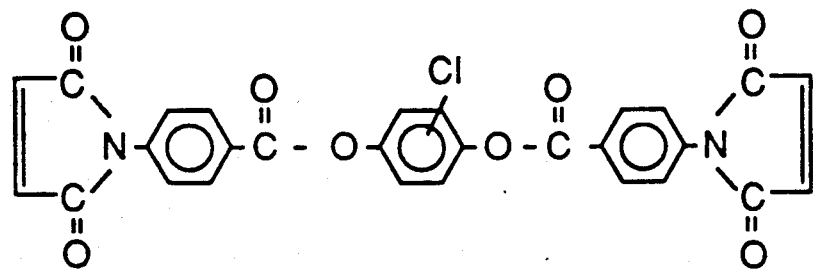
Figure 1H:
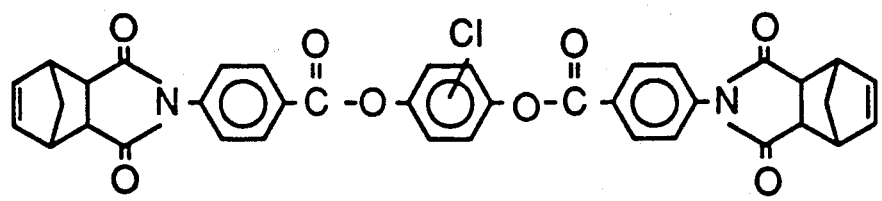
Figure 1I:
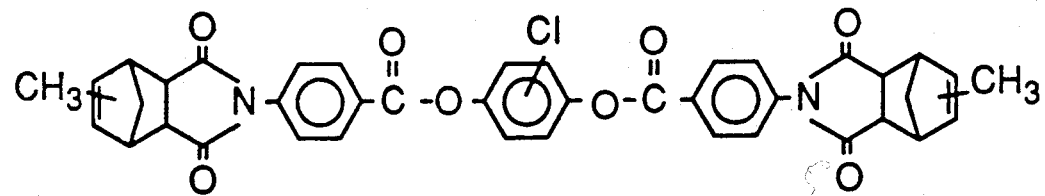
Figure 1J:
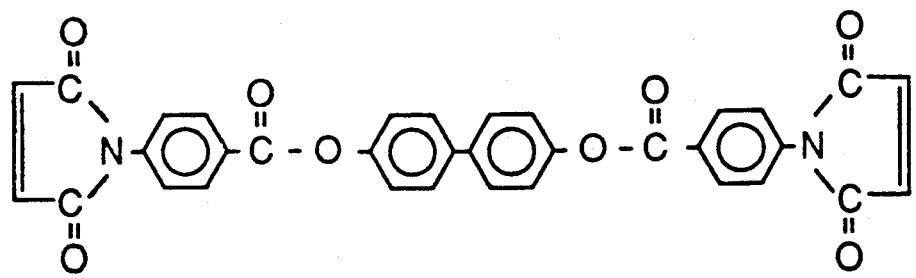
Figure 1K:
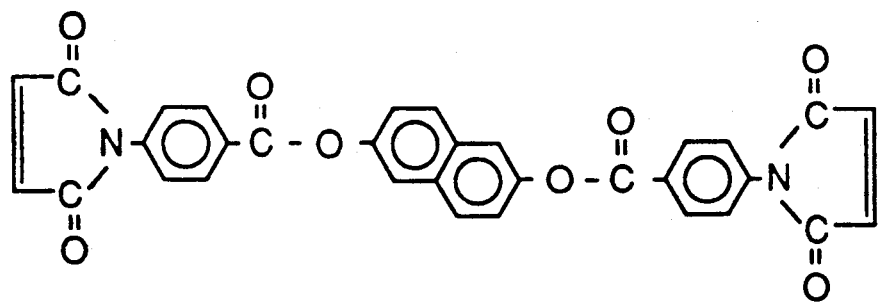
Figure 1L:
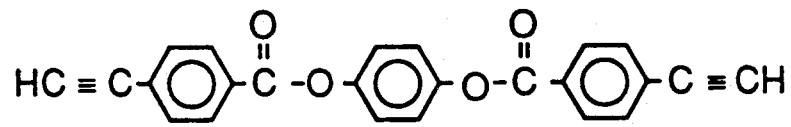
Figure 1M:
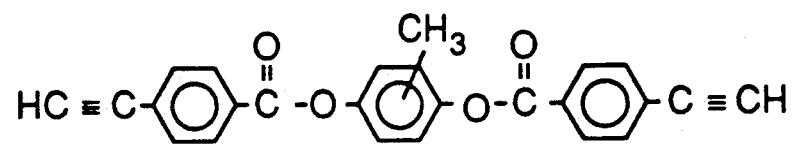
Figure 1N:
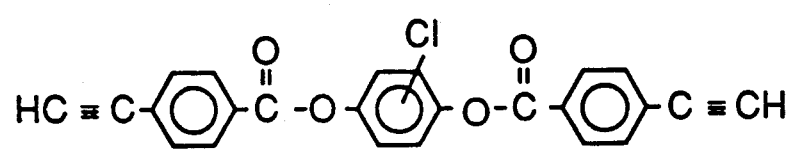
Figure 1O:
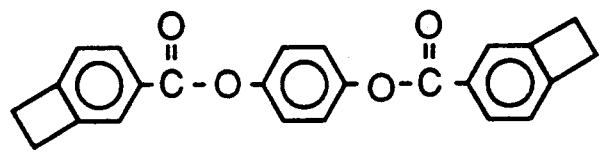

Throughout the present description, where $A^1$ or $A^3$ are bound to a $(C(R^3)_2)_2$ moiety, the combination of such can be referred to as a benzocyclobutene group. FIG. 1(o) illustrates, e.g., the hydroquinone benzocyclobutene ester monomer.

Such curable liquid crystalline polyester compounds or monomers can be prepared by a process including reacting a difunctional compound, i.e., a diol represented by the formula $B^3$—$A^2$—$B^4$ wherein $B^3$ and $B^4$ are —OH, and $A^2$ is selected from the group consisting of 1,4-phenylene, 4,4'-biphenyl, 2,6-naphthylene and the same where said groups contain one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, with an acid chloride represented by the formula

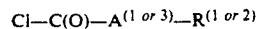

wherein $A^{(1\ or\ 3)}$ is 1,4-phenylene and the same where said group contains one or more substituents selected from the group consisting of halo, e.g., fluoro, chloro, bromo, or iodo, nitro, lower alkyl, e.g., methyl, ethyl, or propyl, lower alkoxy, e.g., methoxy, ethoxy, or propoxy, and fluoroalkyl, e.g., trifluoromethyl, pentafluoroethyl and the like, and either $R^{(1\ or\ 2)}$ is a radical selected from the group consisting of maleimide, substituted maleimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms. Preferably, $R^1$ and $R^2$ are radicals selected from the group consisting of maleimide, nadimide, methyl nadimide, and ethynyl. In this process, i.e., the reaction of the diol with the acid chloride containing the endcapped groups, the result is a liquid crystalline polyester compound or monomer wherein the carbonyl of $B^1$ and $B^2$ are adjacent to $A^1$ or $A^3$. To obtain to preferred products the diol is reacted with the acid chloride in a ratio of diol:acid chloride of 1:2. An acid scavenger such as triethylamine or the like can be added to the reaction mixture. In a similar manner, the reaction of a diacid chloride with a phenol containing the end-capped groups may yield a liquid crystalline polyester compound or monomer wherein the carbonyl of $B^1$ and $B^2$ are adjacent to $A^2$. Such end-capped phenol compounds are described in U.S. Pat. No. 4,661,604.

The acid chlorides can be represented by the formula

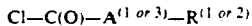

$$Cl-C(O)-A^{(1\ or\ 3)}-R^{(1\ or\ 2)}$$

wherein $A^{(1\ or\ 3)}$ is selected from the group consisting of 1,4-phenylene and the same where said group contains one or more substituents selected from the group consisting of halo, e.g., fluoro, chloro, bromo, or iodo, nitro, lower alkyl, e.g., methyl, ethyl, and propyl, lower alkoxy, e.g., methoxy, ethoxy, or propoxy, and fluoroalkyl or fluoroalkoxy, e.g., trifluoromethyl, pentafluoroethyl and the like, and either $R^{(1\ or\ 2)}$ is a radical selected from the group consisting of maleimide, substituted maleimide, nadimide, or substituted nadimide, can be prepared by reacting para-aminobenzoic acid with the respective anhydride to obtain the respective amic acid, cyclodehydrating the amic acid with a mixture of acetic anhydride and sodium acetate to obtain an intermediate product, and finally reacting the intermediate product with oxalyl chloride to obtain the acid chloride.

Curable blends of the liquid crystalline polyester compounds are also provided by this invention. Such blends can allow the tailoring of properties such as melting points and which may lower the processing temperature of these materials. For example, by blending two or more of the polyester monomers the melting point of the blend can be depressed beneath that of the individual monomers while retaining the liquid crystallinity of the monomers. The liquid crystalline polyester monomers or compounds are represented by the formula

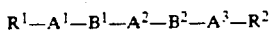

$$R^1-A^1-B^1-A^2-B^2-A^3-R^2$$

where $R^1$, $R^2$, $A^1$, $A^2$, $A^3$, $B^1$ and $B^2$ are as previously described.

The liquid crystalline polyester monomers can be polymerized by heat alone, or by the action of free radical initiators, or by the addition of aromatic polyamines as bridging agents, or by the presence of a catalytic amount of an alkali metal salt of a Bronsted acid. Preferably, with monomers including the end groups of ethynyl and benzocyclobutene, such monomers are polymerized by heat.

In addition to homopolymerization, the liquid crystalline polyester monomers can be polymerized with various vinyl monomers such as styrene, acrylonitrile, acrylates and methacrylates, or with other type maleimide capped compounds. Such copolymerizations can be initiated by free radical generating materials such as peroxides, azo compounds, etc. as well known to one skilled in the art of polymerization.

The end-capped compounds or monomers of the present invention can be used in forming prepregs or composites as is standard in the art. Crosslinking with the end-capped compounds generally can occur with heat alone upon heating the compounds to from about 170° C. to about 370° C., preferably from about 200° C. to about 340° C.

Prepregs of the end-capped compounds or monomers can be prepared by conventional techniques. While woven fabrics are the typical reinforcement, the fibers can be continuous or discontinuous, i.e., in chopped or whisker form, and may be ceramic, organic, glass, or carbon, i.e., graphite, as is desired for the particular application.

Composites can be formed by curing the end-capped compounds or prepregs in conventional vacuum bag techniques. The end-capped compounds may also be used as adhesives, varnishes, films, or coatings.

The present invention is more particularly described in the following examples which are intended as illustrative only, since numerous modifications and variations will be apparent to those skilled in the art.

EXAMPLE A

N-(para-carboxyphenyl)maleimide was prepared as follows. Maleic anhydride (45.2 grams (g)) was dissolved in from 300–400 milliliters (ml) of acetone. To this solution, an equimolar amount of para-aminobenzoic acid (63.2 g) was added with rapid stirring. The reaction mixture solidified within a few seconds. Excess solvent was removed by evaporation to yield the amic acid intermediate which was then dried overnight at 65° C. under vacuum.

The dried intermediate material was then dissolved in 200 ml of dimethyl formamide and heated to 45° C. Acetic anhydride (72 ml) and anhydrous sodium acetate (3.6 g) were then added with stirring. The reaction was allowed to proceed at 45° C. for two hours after which the mixture was poured into one liter of water slightly acidified by addition of 10 ml of concentrated HCl. The resultant yellow product was collected by suction filtration, washed with water and dried at 80° C. under vacuum.

EXAMPLE B

N-(para-carboxyphenyl)nadimide was prepared as follows. Cis-5-norbornene-endo-2,3-dicarboxylic anhydride (19.14 g) was gently heated in 70 ml of acetone until it dissolved. To this solution, an equimolar amount of para-aminobenzoic acid (16.05 g) was added with rapid stirring. The reaction mixture turned the color white with a slight tinge of pink. Heating was stopped after five minutes and stirring maintained for about 20 minutes to ensure complete reaction. The amic acid intermediate which was then dried overnight at 65° C. under vacuum.

The dried intermediate material was then suspended in 65 ml of dimethyl formamide and heated to 45° C. Acetic anhydride (30 ml) and anhydrous sodium acetate (1.27 g) were then added with stirring. The reaction was allowed to proceed at 45° C. for two hours after which the mixture was poured into one liter of water slightly acidified by addition of 10 ml of concentrated HCl. The resultant white product was collected by suction filtration, washed with water and dried at 80° C. under vacuum.

EXAMPLE C

N-(para-carboxyphenyl)methyl nadimide was prepared as follows. Methyl-5-norbornene-2,3-dicarboxylic anhydride (18.48 g) was dissolved in 45 ml of acetone. To this solution, an equimolar amount of para-aminobenzoic acid (14.2 g) was added with rapid stirring. The reaction mixture turned the color yellow. Stirring was maintained for about 20 minutes to ensure complete reaction. The yellow intermediate material was then dried overnight at 65° C. under vacuum.

A cyclodehydration reaction was then performed on the dried intermediate material in the manner of Examples A and B. The resultant white product was collected by suction filtration, washed with water and dried at 80° C. under vacuum.

EXAMPLE D

Para-maleimidobenzoyl chloride was prepared in accordance with the procedure described by Adams et al. in J. Am. Chem. Soc., 42, 599 (1920). The N-(para-carboxyphenyl) maleimide (15 g) was suspended in about 80 ml of benzene with stirring. To this mixture was added 15 ml (a 2.5:1 molar excess) of oxalyl chloride, whereupon some gas was evolved. The mixture was then heated slowly to reflux and maintained at reflux for two hours. Excess oxalyl chloride was removed by distillation. The reaction mixture was then cooled and the yellow product recovered by suction filtration. The resultant product was washed with hexane and dried under vacuum at room temperature.

EXAMPLE E

Para-nadimidobenzoyl chloride and para-(methyl nadimido)benzoyl chloride were prepared from the products of Examples B and C in the same manner as Example D.

EXAMPLE 1

Preparation of hydroquinone bismaleimide ester monomer, shown in FIG. 1(a), was as follows. Hydroquinone (1.086 g, 0.0099 moles) was suspended in 25 ml diethyl ether and 3.3 ml of triethylamine. The solution was cooled in an ice bath and the acid chloride (4.64 g) from Example D was carefully added with stirring. Stirring was continued for about 30 minutes to ensure complete reaction. The mixture was heated to evaporate the solvent and the resultant product recrystallized from a 60/40 (v/v) phenol/trichloroethane mixture and dried at 80° C. under vacuum. The hydroquinone bismaleimide ester monomer had a crystalline to nematic phase transition of 282° C. as determined from differential scanning calorimetry and polarized optical microscopy.

EXAMPLE 2

Preparation of hydroquinone bisnadimide ester monomer, shown in FIG. 1(b), was as follows. Hydroquinone (0.365 g, 0.0033 moles) was suspended in 10 ml diethyl ether and 0.93 ml of triethylamine. The solution was cooled in an ice bath and 2.0 g of the para-nadimidobenzoyl chloride from Example E was carefully added with stirring. The reaction was exothermic. Stirring was continued for about 30 minutes to ensure complete reaction. The mixture was heated to evaporate the solvent and the resultant product recrystallized from a mixture of trichloroethane/hexane and dried at 80° C. under vacuum. The hydroquinone bisnadimide ester monomer had a crystalline to nematic phase transition of 307° C. as determined from differential scanning calorimetry and polarized optical microscopy.

EXAMPLE 3

Preparation of hydroquinone bis(methyl nadimide) ester monomer, shown in FIG. 1(c), was as follows. Hydroquinone (0.349 g) was suspended in 10 ml diethyl ether with 0.89 ml of triethylamine. The solution was cooled in an ice bath and 2.0 g of the para-(methyl nadimido)benzoyl chloride from Example E was carefully added with stirring. The reaction was exothermic. Stirring was continued for about 1.5 hours to ensure complete reaction. The mixture was heated to evaporate the solvent and the resultant product recrystallized from hexane and dried at 80° C. under vacuum. The hydroquinone bis(methyl nadimide) ester monomer had a crystalline to nematic phase transition of 288° C. as determined from differential scanning calorimetry and polarized optical microscopy.

EXAMPLE 4

Preparation of methylhydroquinone bismaleimide ester monomer, shown in FIG. 1(d), was as follows. Methylhydroquinone (0.527 g) was dissolved in 15 ml diethyl ether with 1.2 ml of triethylamine. The solution was cooled in an ice bath and 2.0 g of the acid chloride from Example D was carefully added with stirring. Stirring was continued for about 45 minutes to ensure complete reaction. The mixture was heated to evaporate the solvent and the resultant product recrystallized from a mixture of 1,2-dichloroethane/hexane and dried at 80° C. under vacuum. The methylhydroquinone bismaleimide ester monomer had a crystalline to nematic phase transition of 245° C. as determined from differential scanning calorimetry and polarized optical microscopy.

EXAMPLE 5

Preparation of methylhydroquinone bisnadimide ester monomer, shown in FIG. 1(e), was as follows. Methylhydroquinone (0.412 g) was dissolved in 15 ml diethyl ether with 0.9 ml of triethylamine. The solution was cooled in an ice bath and 2.0 g of the para-nadimidobenzoyl chloride from Example E was carefully added with stirring. Stirring was continued for about 30 minutes to ensure complete reaction. The mixture was heated to evaporate the solvent and the resultant product recrystallized from 1,2-dichloroethane/hexane and dried at 80° C. under vacuum. The methylhydroquinone bisnadimide ester monomer had a crystalline to nematic phase transition of 271° C. as determined from differential scanning calorimetry and polarized optical microscopy.

EXAMPLE 6

Preparation of methylhydroquinone bis(methyl nadimide) ester monomer, shown in FIG. 1(f), was as follows. Methylhydroquinone (0.197 g, 0.00158 moles) was dissolved in 12 ml diethyl ether with 0.45 ml of triethylamine. The solution was cooled in an ice bath and 1 g of the para-(methyl nadimido)benzoyl chloride from Example E was carefully added with stirring. Stirring was continued for about 30 minutes to ensure complete reaction. The mixture was heated to evaporate the solvent and the resultant product recrystallized from a mixture of toluene/hexane and dried at 80° C. under vacuum. The methylhydroquinone bis(methyl nadimide) ester monomer had a crystalline to nematic phase transition of 211° C. as determined from differential scanning calorimetry and polarized optical microscopy.

EXAMPLE 7

Preparation of chlorohydroquinone bismaleimide ester monomer, shown in FIG. 1(g), was as follows. Chlorohydroquinone (0.613 g, 0.0042 moles) was dissolved in 15 ml diethyl ether with 1.2 ml of triethylamine. The solution was cooled in an ice bath and 2.0 g of the acid chloride from Example D was carefully added with stirring. Stirring was continued for about 1 hour to ensure complete reaction. The mixture was heated to evaporate the solvent and the resultant product recrystallized from a mixture of methylene chloride/hexane and dried at 80° C. under vacuum. The chlorohydroquinone bismaleimide ester monomer had a crystalline to nematic phase transition of 215° C. as determined from differential scanning calorimetry and polarized optical microscopy.

EXAMPLE 8

Preparation of chlorohydroquinone bisnadimide ester monomer, shown in FIG. 1(h), was as follows. Chlorohydroquinone (0.479 g, 0.0033 moles) was dissolved in 15 ml diethyl ether with 0.45 ml of triethylamine. The solution was cooled in an ice bath and 2.0 g of the paranadimidobenzoyl chloride from Example E was carefully added with stirring. Stirring was continued for about 1 hour to ensure complete reaction. The mixture was heated to evaporate the solvent and the resultant product recrystallized from a mixture of 1,1,2-trichloroethane/hexane and dried at 80° C. under vacuum. The chlorohydroquinone bisnadimide ester monomer had a crystalline to nematic phase transition of 271° C. as determined from differential scanning calorimetry and polarized optical microscopy.

EXAMPLE 9

Preparation of chlorohydroquinone bis(methyl nadimide) ester monomer, shown in FIG. 1(i), was as follows. Chlorohydroquinone (0.458 g) was dissolved in 15 ml diethyl ether with 0.9 ml of triethylamine. The solution was cooled in an ice bath and 2.0 g of the para-(methyl nadimido)benzoyl chloride from Example E was carefully added with stirring. The reaction was exothermic. Stirring was continued for about 1 hour to ensure complete reaction. The mixture was heated to evaporate the solvent and the resultant product recrystallized from acetone/water and dried at 80° C. under vacuum. The chlorohydroquinone bis(methyl nadimide) ester monomer had a crystalline to nematic phase transition of 255° C. as determined from differential scanning calorimetry and polarized optical microscopy.

EXAMPLE 10

Preparation of biphenyl bismaleimide ester monomer, shown in FIG. 1(j), was as follows. Biphenol (0.792 g, 0.0043 moles) was suspended in 10 ml diethyl ether and 1.4 ml of triethylamine. The solution was cooled in an ice bath and 2.0 g of the acid chloride from Example D was carefully added with stirring. Stirring was continued for about 90 minutes to ensure complete reaction. The resultant product was collected by suction filtration, washed with chloroform and dried at 20° C. under vacuum. The biphenyl bismaleimide ester monomer had a crystalline to nematic phase transition of 299° C. as determined from differential scanning calorimetry and polarized optical microscopy.

EXAMPLE 11

Preparation of naphthyl bismaleimide ester monomer, shown in FIG. 1(k), was as follows. 2,6-dihydroxynaphthalene (0.681 g, 0.0043 moles) was suspended in 10 ml diethyl ether and 1.4 ml of triethylamine. The solution was cooled in an ice bath and 2.0 g of the acid chloride from Example D was carefully added with stirring. Stirring was continued for about 90 minutes to ensure complete reaction. The resultant product was collected by suction filtration, washed with chloroform and dried at 20° C. under vacuum. The naphthyl bismaleimide ester monomer had a crystalline to nematic phase transition of 287° C. as determined from differential scanning calorimetry and polarized optical microscopy.

EXAMPLE 12

Preparation of hydroquinone bis(ethynyl) ester monomer, shown in FIG. 1(l), was as follows. Hydroquinone (0.67 g) was suspended in 15 ml diethyl ether with 1.7 ml of triethylamine. The solution was cooled in an ice bath and 4-ethynylbenzoyl chloride (2.0 g) was carefully added with stirring. The tan product solidified almost immediately. The product was recrystallized from 1,1,2,2-tetrachloroethane and dried.

EXAMPLE 13

Preparation of methylhydroquinone bis(ethynyl) ester monomer, shown in FIG. 1(m), was as follows. Methylhydroquinone (0.756 g) was dissolved in 15 ml diethyl ether. The solution was cooled in an ice bath and 4-ethynylbenzoyl chloride (2.0 g) was carefully added with stirring. To this mixture was added 1.7 ml of triethylamine. A large exotherm was observed. The product was recrystallized from acetonitrile and dried. The methylhydroquinone bis(ethynyl) ester monomer had a crystalline to nematic phase transition of 173° C. as determined from differential scanning calorimetry.

EXAMPLE 14

Preparation of chlorohydroquinone bis(ethynyl) ester monomer, shown in FIG. 1(n), was as follows. Chlorohydroquinone (0.88 g) was dissolved in 15 ml diethyl ether. The solution was cooled in an ice bath and 4-ethynylbenzoyl chloride (2.0 g) was carefully added with stirring. To this mixture was added 1.7 ml of triethylamine. A large exotherm was observed. The product was recrystallized from a mixture of 1,1,2,2-tetrachloroethane and acetonitrile and then dried at 125° C. under vacuum. The chlorohydroquinone bis(ethynyl) ester monomer had a crystalline to nematic phase transition of 187° C. as determined from differential scanning calorimetry.

EXAMPLE 15

Approximately equal amounts of the crystalline powders from Examples 10 and 11 were mixed on a glass plate and gradually heated. The blend melted to a nematic phase at 268° C. and crosslinked with continued heating. In comparison, the monomer from Example 10 had a melting point of 299° C. and the monomer from Example 11 had a melting point of 287° C.

While the present invention has been described with reference to specific details, it is not intended that such details should be regarded as limitations upon the scope of the invention, except as and to the extent that they are included in the accompanying claims.

What is claimed is:

1. A curable liquid crystalline polyester monomer represented by the formula:

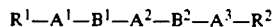

where $R^1$ and $R^2$ are radicals of ethynyl, $A^1$ and $A^3$ are 1,4-phenylene and the same where said groups contain one or more substituents selected from the group consisting of halo, nitro, lower alkyl, lower alkoxy, fluoroalkoxy or fluoroalkyl, $A^2$ is selected from the group consisting of substituted 1,4-phenylene containing one or more substituents selected from the group consisting of halo, nitro, lower alkyl, lower alkoxy, or fluoroalkyl, or 4,4'-biphenyl, 2,6-naphthalene and the same where said groups contain one or more substituents selected from the group consisting of halo, nitro, lower alkyl, lower alkoxy, or fluoroalkyl, and $B^1$ and $B^2$ are selected from the group consisting of —C(O)—O— and —O—C(O)—.

2. The curable liquid crystalline polyester monomer of claim 1 wherein $A^1$ and $A^3$ are 1,4-phenylene, $A^2$ is a substituted 1,4-phenylene group containing one or more substituents selected from the group consisting of halo, nitro, lower alkyl, lower alkoxy, or fluoroalkyl, and $B^1$ and $B^2$ are —C(O)—O— groups wherein the —C(O)— functionalities of $B^1$ and $B^2$ are adjacent to $A^1$ and $A^3$.

3. The curable liquid crystalline polyester monomer of claim 1 wherein $R^1$ and $R^2$ are ethynyl groups, $A^1$ and $A^3$ are 1,4-phenylene, $A^2$ is a 1,4-phenylene group containing a methyl substituent upon the ring, and $B^1$ and $B^2$ are —C(O)—O— groups wherein the —C(O)— functionalities of $B^1$ and $B^2$ are adjacent to $A^1$ and $A^3$.

4. The curable liquid crystalline polyester monomer of claim 1 wherein $R^1$ and $R^2$ are ethynyl groups, $A^1$ and $A^3$ are 1,4-phenylene, $A^2$ is a 1,4-phenylene group containing a chloro substituent upon the ring, and $B^1$ and $B^2$ are —C(O)—O— groups wherein the —C(O)— functionalities of $B^1$ and $B^2$ are adjacent to $A^1$ and $A^3$.

5. A curable blend comprised of at least two liquid crystalline polyester monomers represented by the formula:

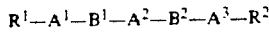

where $R^1$ and $R^2$ are radicals selected from the group consisting of maleimide, nadimide, methyl nadimide, and ethynyl, $A^1$ and $A^3$ are 1,4-phenylene and the same where said groups contain one or more substituents selected from the group consisting of halo, nitro, lower alkyl, lower alkoxy, fluoroalkoxy or fluoroalkyl, $A^2$ is selected from the group consisting of substituted 1,4-phenylene containing one or more substituents selected from the group consisting of halo, nitro, lower alkyl, lower alkoxy, or fluoroalkyl, or 4,4'-biphenyl, 2,6-naphthalene and the same where said groups contain one or more substituents selected from the group consisting of halo, nitro, lower alkyl, lower alkoxy, or fluoroalkyl where $R^1$ or $R^2$ are ethynyl or $A^2$ is selected from the group consisting of 1,4-phenylene, 4,4'-biphenyl, 2,6-naphthalene and the same where said groups contain one or more substituents selected from the group consisting of halo, nitro, lower alkyl, lower alkoxy, or fluoroalkyl where $R^1$ or $R^2$ are maleimide, nadimide, or methyl nadimide, and $B^1$ and $B^2$ are selected from the group consisting of —C(O)—O— and —O—C(O)—.

6. A thermoset liquid crystalline polyester composition comprised of cured segments derived from one or more monomers represented by the formula:

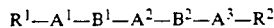

where $R^1$ and $R^2$ are radicals of ethynyl, $A^1$ and $A^3$ are phenylene and the same where said groups contain one or more substituents selected from the group consisting of halo, nitro, lower alkyl, lower alkoxy, fluoroalkoxy or fluoroalkyl, $A^2$ is selected from the group consisting of substituted 1,4-phenylene containing one or more substituents selected from the group consisting of halo, nitro, lower alkyl, lower alkoxy, or fluoroalkyl, or 4,4'-biphenyl, 2,6-naphthalene and the same where said groups contain one or more substituents selected from the group consisting of halo, nitro, lower alkyl, lower alkoxy, or fluoroalkyl, and $B^1$ and $B^2$ are selected from the group consisting of —C(O)—O— and —O—C(O)—.

7. A process of preparing a curable liquid crystalline polyester monomer represented by the formula:

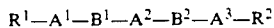

where $R^1$ and $R^2$ are radicals of ethynyl, $A^1$ and $A^3$ are phenylene and the same where said groups contain one or more substituents selected from the group consisting of halo, nitro, lower alkyl, lower alkoxy, fluoroalkoxy or fluoroalkyl, $A^2$ is selected from the group consisting of substituted 1,4-phenylene containing one or more substituents selected from the group consisting of halo, nitro, lower alkyl, lower alkoxy, or fluoroalkyl, or 4,4'-biphenyl, 2,6-naphthalene and the same where said groups contain one or more substituents selected from the group consisting of halo, nitro, lower alkyl, lower alkoxy, or fluoroalkyl, and $B^1$ and $B^2$ are selected from the group consisting of —C(O)—O— and —O—C(O)—, said process comprising: reacting a difunctional compound represented by the formula $B^3$—$A^2$—$B^4$ wherein $B^3$ and $B^4$ are —OH, and $A^2$ is selected from the group consisting of substituted 1,4-phenylene containing one or more substituents selected from the group consisting of halo, nitro, lower alkyl, lower alkoxy, or fluoroalkyl, or 4,4'-biphenyl, 2,6-naphthalene and the same where said substituents selected from the group consisting of halo, nitro, lower alkyl, lower alkoxy, or fluoroalkyl, with an acid chloride represented by the formula: Cl—C(O)—$A^1$—$R^1$ wherein $A^1$ is 1,4-phenylene and the same where said groups contain one or more substituents selected from the group consisting of halo, nitro, lower alkyl, lower alkoxy, fluoroalkoxy or fluoroalkyl, and $R^1$ is a radical of ethynyl.

* * * * *